Patented Jan. 2, 1923.

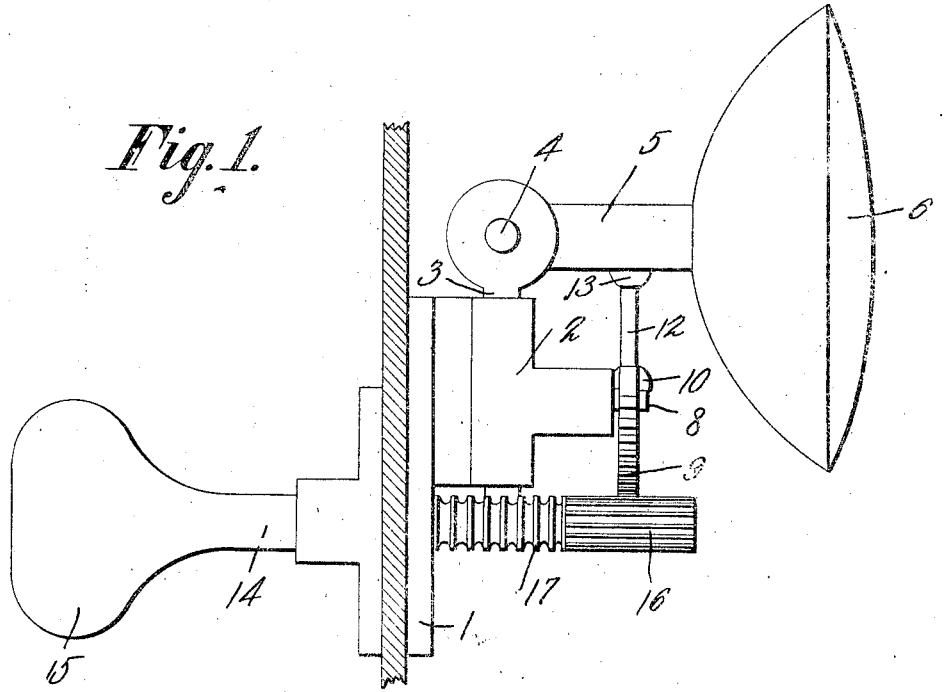
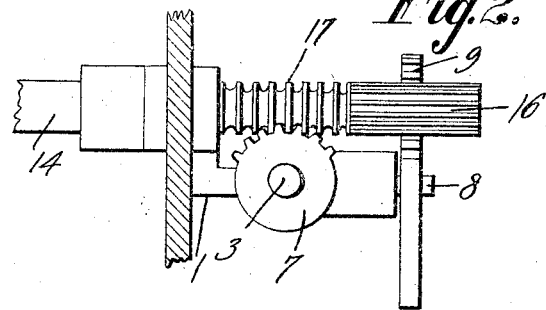
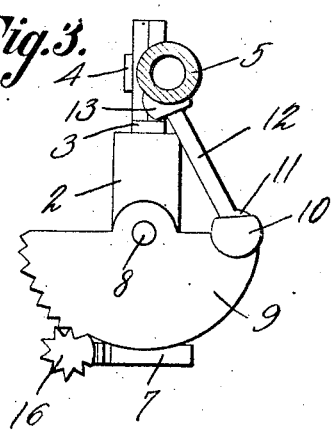

1,441,192

UNITED STATES PATENT OFFICE.

AARON F. WOOD AND WILLIAM R. WOOD, OF VAN WERT, OHIO.

SPOTLIGHT CONTROL.

Application filed April 15, 1921. Serial No. 461,601.

*To all whom it may concern:*

Be it known that we, AARON F. WOOD and WILLIAM R. WOOD, citizens of the United States, residing at Van Wert, in the county of Van Wert, State of Ohio, have invented a new and useful Spotlight Control, of which the following is a specification.

This invention relates to means for controlling a spot light such as used on automobiles, one of the objects of the invention being to provide a structure of this character especially adapted for use in connection with a closed vehicle whereby the spot light can be swung either laterally or upwardly or downwardly to direct the light rays wherever desired.

A further object is to provide controlling mechanism of this character which is operated from a single handle capable of being either rotated or shifted longitudinally for the purpose of moving the spot light to a desired position.

Another object is to provide a structure of this character which is simple, durable and compact in construction and can be readily applied to a motor vehicle.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred forms of the invention have been shown.

In said drawings—

Figure 1 is a side elevation of one form of spot light control.

Figure 2 is a bottom plan view of the gearing shown in Figure 1.

Figure 3 is an end elevation, the arm of the spot light being shown in section.

Referring to the figures by characters of reference 1 designates an attaching plate adapted to be secured to a part of the automobile structure and extending from this plate is a bracket 2 in which is journaled an upstanding stem 3. To the upper end of the stem is pivotally connected, as at 4, an arm 5 projecting rearwardly from the spot light 6. A segmental gear 7 is secured to the lower end of the stem 3 and mounted for rotation upon a stud 8 projecting outwardly from the bracket 2 is a segmental gear 9 which rotates in a plane at right angles to the plane of rotation of the gear 7. A socket 10 is carried by the segmental gear 7 and receives a ball 11 at one end of a pitman 12, the other end of the pitman being connected by a ball and socket joint 13 to the arm 5.

Slidably mounted in the plate 1 is an operating stem 14 having a knob 15 at one end while at the other end is an elongated gear 16 the teeth of which are arranged longitudinally of the stem and mesh with the segmental gear 9. Between the gear 16 and the plate 1 the stem 14 is provided with spaced annular ribs 17 which mesh with the gear 7. Thus it will be seen that when the stem 14 is pushed or pulled longitudinally the ribs 17 meshing with the gear 7 will cause said gear to rotate and will swing the spot light 6 laterally. By rotating the stem 14 the gear 16 will rotate the segmental gear 9 and cause the pitman 12 to raise or lower the arm 5. Thus it will be seen that the spot light can be adjusted angularly either horizontally or vertically so as to project the light rays in any desired direction.

It will be noted that the structure will allow the spot light to be controlled from within an enclosed vehicle.

What is claimed is:—

In a device of the class described, an attachment plate, a bracket extending laterally therefrom, an upstanding stem journaled in said bracket, a lamp carrying arm pivoted at one end to the upper end of said stem, a segmental gear carried by said stem, another segmental gear mounted on said bracket and rotatable in a plane at right angles to the stem carried gear, a pitman connecting said bracket carried gear and said lamp arm and having a ball and socket connection therewith, an operating stem slidably mounted in said plate and having a series of annular ribs and a series of longitudinally extending ribs meshing respectively with said gears, whereby the light may be tilted vertically or moved laterally.

In testimony that we claim the foregoing as our own, we have hereto affixed our signatures in the presence of two witnesses.

AARON F. WOOD.
WILLIAM R. WOOD

Witnesses:
STANLEY EIKENBARY,
R. J. HOFMANN.